I. KEITH.

Dumping Car.

No. 3,679. Reissued Oct. 19, 1869.

Witnesses:

S. N. Piper.

J. P. Snow

Isaac Hiram T. and Isaac N. Keith by their attorney:

R. Reed.

UNITED STATES PATENT OFFICE.

ISAAC KEITH, HIRAM T. KEITH, AND ISAAC N. KEITH, OF WEST SANDWICH, MASSACHUSETTS, ASSIGNEES OF ISAAC KEITH.

IMPROVED DUMPING-CAR.

Specification forming part of Letters Patent No. 92,457, dated July 13, 1869; Reissue No. 3,679, dated October 19, 1869.

*To all whom it may concern:*

Whereas Letters Patent No. 92,457, dated July 13, 1869, have been granted to the undersigned, ISAAC KEITH, HIRAM T. KEITH, and ISAAC N. KEITH, of West Sandwich, Massachusetts, as assignees of the inventor, ISAAC KEITH, (one of the said assignees,) for an invention of an Improved Dumping-Car; and whereas by reason of a defective or insufficient description and claims the said Letters Patent are believed to be inoperative, invalid, or not fully available to us, and we have applied for leave to surrender the same for reissue on an amended or new specification. Now, therefore, we, the said ISAAC KEITH, HIRAM T. KEITH, and ISAAC N. KEITH, do hereby declare the said invention to be more fully described in the following specification and represented in the accompanying drawings, of which—

Figure 1:
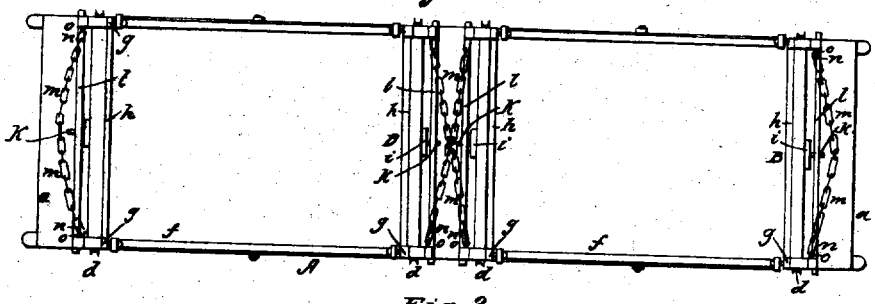
Figure 2:
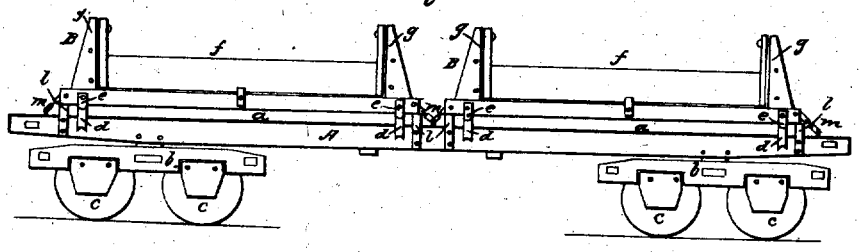
Figure 3:
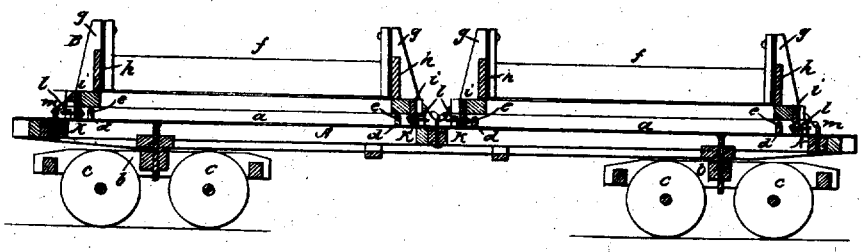
Figure 4:
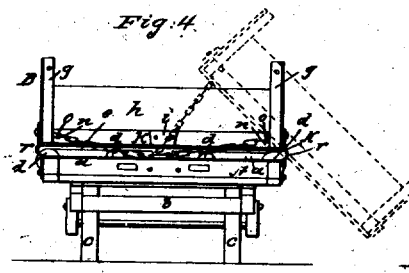
Figure 5:
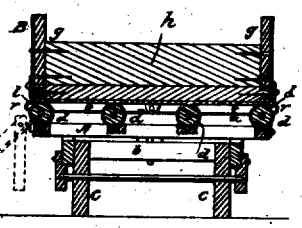

Figure 1 is a top view, Fig. 2 a side elevation, Fig. 3 a longitudinal section, Fig. 4 an end elevation, and Fig. 5 a transverse section, of a long car or railway-carriage provided with the said invention.

In such drawings, A denotes a double-truck and single-platform car—that is, one having a platform, *a*, and two trucks, *b b*, each of the said trucks being provided with four supporting-wheels, *c c c c*, and two axles thereto, the whole being what in common parlance is termed a "platform long car." The invention is, however, applicable to cars that have their platforms sustained by less or more than eight wheels, or which are without swiveling trucks arranged underneath the platform. The trucks of the long car are generally applied to the platform, so as to be capable of swiveling or turning thereunder on pivots or king-bolts or the equivalent thereof. These are shown in Fig. 3 of the drawings.

To the platform of the car, so as to extend transversely across and above it, there are applied two or more series of rollers or grooved wheels, *d d d d*. Those of each series are to be arranged in a right line with each other, and at or about at equal distances apart, and parallel with those of the next or fellow series, and each wheel is to be so applied to the platform as to be capable of freely revolving therein.

On the grooved peripheries of each series of wheels a rail or receiver, *e*, projecting downward from a dumping-sledge or tip-cart body, B, rests. There are to be two or any other suitable number of such dumping-sledges or cart-bodies arranged over the platform *a*, which is to be provided with two or more series of bearing-rollers for each of such sledges or cart-bodies. Each sledge or cart-body is also to have a runner for each set or series of wheels.

Instead of the series of wheels being applied directly to the platform, they may be affixed to the tip-cart body or bodies, in which case the runners or rails should be applied to and so as to project upward from the top of the platform or carriage body or frame. Furthermore, each of the dumping-sledges or cart-bodies may be constructed with two pendulous sides or swinging tails, *f f*, formed as represented, and pivoted to the upper parts of posts *g g*, such posts being erected at the corners of the sledge or cart-body. Two boards, *h h*, should or may also be applied to each cart-body. There also projects from each end of such cart-body a stud or middle stop, *k*, which, as represented in the drawings, is extended underneath a guide-bar, *l*, running across the platform and elevated a short distance above and parallel to it.

At or near its two ends the guide-bar *l* is bent downward, in manner as shown at *r r* in Fig. 4, and afterward is fastened to the sides of the platform. The parts *r r* constitute lateral stops or abutments for the studs or middle stops, *k k*, to bring up against when the tip cart is moved to one extreme of its distance from the middle of the platform, or, in other words, is moved into a position to be tipped or dumped for the purpose, when laden, of discharging its load.

Near the middle of each guide-bar *l* there are secured to the platform or carriage-frame two chains, *m m*, there being two of such chains to each end of each tip-cart body. At their outer ends the chains are to be provided with hooks *n n* to enter staples *o o* extended from the cart-body, the said staples being fixed near the extreme of the end of the body. The guides *l l*, when used, keep the cart-body in place on the wheels of the platform. The pair of chains at each end of a tip-cart body, when hooked to the staples of such end, serve to prevent the body from moving in either direction laterally of and with respect to the platform. When, however, it may be desirable to dump or tip a cart-body in order to discharge a load of earth, gravel, or other matter therefrom the chains next the side of the platform over which the cart-body is to be tipped should first be unhooked from their staples. Next the cart-body should be moved laterally until its middle studs, *k k*, may bring up against the lateral stops or upright parts *r r* of the guides *l l*, after which, in order to discharge its load, the sledge or cart-body may be tipped over the edge of the platform into the position as shown in dotted lines in Fig. 4.

The bodies of common four-wheel dumping-cars do not slide on their wheel-frames, but are applied thereto so as to simply turn in or on bearings arranged at the middle of the bodies and frames.

By supporting the tip-cart or body by means substantially as described, so that it may be moved horizontally in one or either direction from the middle of the platform, so as to project over and beyond one edge or side thereof, such cart-body may be tipped into an inclined position, so as to discharge its earth or load at a greater distance from the supporting-wheels of the platform than would be the case were the body to tip only at the middle of the platform.

With common dumping-cars as ordinarily constructed the earth will often be dumped too near the wheels, so as to fall between them or upon the rails of the railway-track, so as to be in the way of the wheels, it being often requisite to remove such earth before the car can be started or moved on the track.

We are aware that it is not new to run upon a long-car platform a series of small baggage crates or cars provided with wheels, and therefore we make no claim to such as the invention of the said ISAAC KEITH.

What, however, we do claim as of his invention may be stated as follows:

1. The combination and arrangement of the rails *c* and wheels *d* and the middle and lateral stops, *k r r*, or their equivalents, with a tip-cart body, B, and a railway-carriage, A.

2. The combination and arrangement of the chains *m*, or their equivalents, with a railway-carriage, A, and a tip-cart body, B, the supporting-wheels *d* and rails *c*, and middle and lateral stops, *k r r*, or the equivalents thereof, the whole being substantially as set forth.

3. The combination and arrangement of the guide-rails *l*, or their equivalents, with a railway-carriage, A, a tip-cart body, B, and the supporting-wheels *d* and rails *e*, and stops *k r r* of such tip-cart body, the whole being substantially as explained.

4. A long car or platform, *a*, and two or more trucks, *b b*, and one or more tip-cart bodies, B, and supporting-wheels *d*, rails *e*, and middle and lateral stops, *k r r*, or their equivalents, arranged in combination, essentially as described.

ISAAC KEITH. [L. S.]
HIRAM T. KEITH. [L. S.]
ISAAC N. KEITH. [L. S.]

Witnesses:
B. B. HARLOW,
A. E. AMES.